United States Patent [19]

Gardner

[11] Patent Number: 4,725,899
[45] Date of Patent: Feb. 16, 1988

[54] REPRODUCTION OF MAGNETIC RECORDINGS

[76] Inventor: John P. Gardner, 24 Bounces Rd., London N 9, England

[21] Appl. No.: 832,828

[22] Filed: Feb. 24, 1986

[30] Foreign Application Priority Data

Feb. 25, 1985 [GB] United Kingdom ............... 8504765

[51] Int. Cl.[4] .................... G11B 5/86; G11B 27/36
[52] U.S. Cl. .................................. 360/15; 360/31
[58] Field of Search ............. 360/78, 15, 73, 74.1, 360/31

[56] References Cited

U.S. PATENT DOCUMENTS

| | | | |
|---|---|---|---|
| 3,984,763 | 10/1976 | Koester et al. | 360/31 |
| 4,310,861 | 1/1982 | Kashio | 360/78 |
| 4,375,655 | 3/1983 | Korth et al. | 360/15 |

OTHER PUBLICATIONS

PCT/US83/00848–International Application published under The Patent Cooperation Treaty.
European Patent Application No. 82304820.2.
European Patent Application No. 83305530.4.

Primary Examiner—Vincent P. Canney
Attorney, Agent, or Firm—Trexler, Bushnell, Giangiorgi & Blackstone, Ltd.

[57] ABSTRACT

A method and apparatus for reproducing magnetic recordings of digital data information particularly on flexible plastics discs known as "Floppy" discs. Data information is copied from one disc to another regardless of the encoding of information and the format of the disc without data corruption upon track changing by the recording transducer, it being unnecessary for the copier to react in any way to the data information in order to identify the buffer zones at which track changing must take place.

10 Claims, 19 Drawing Figures

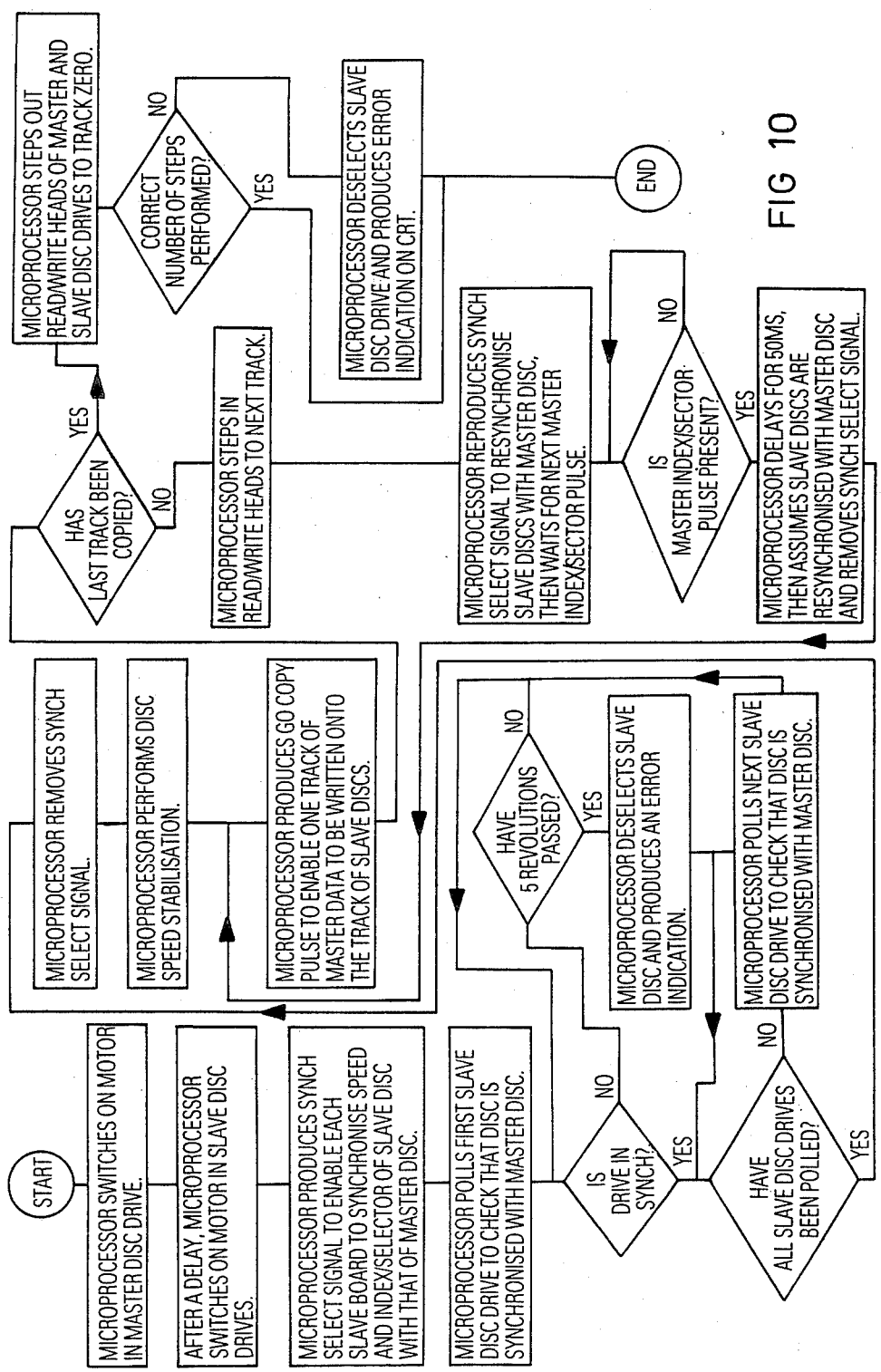

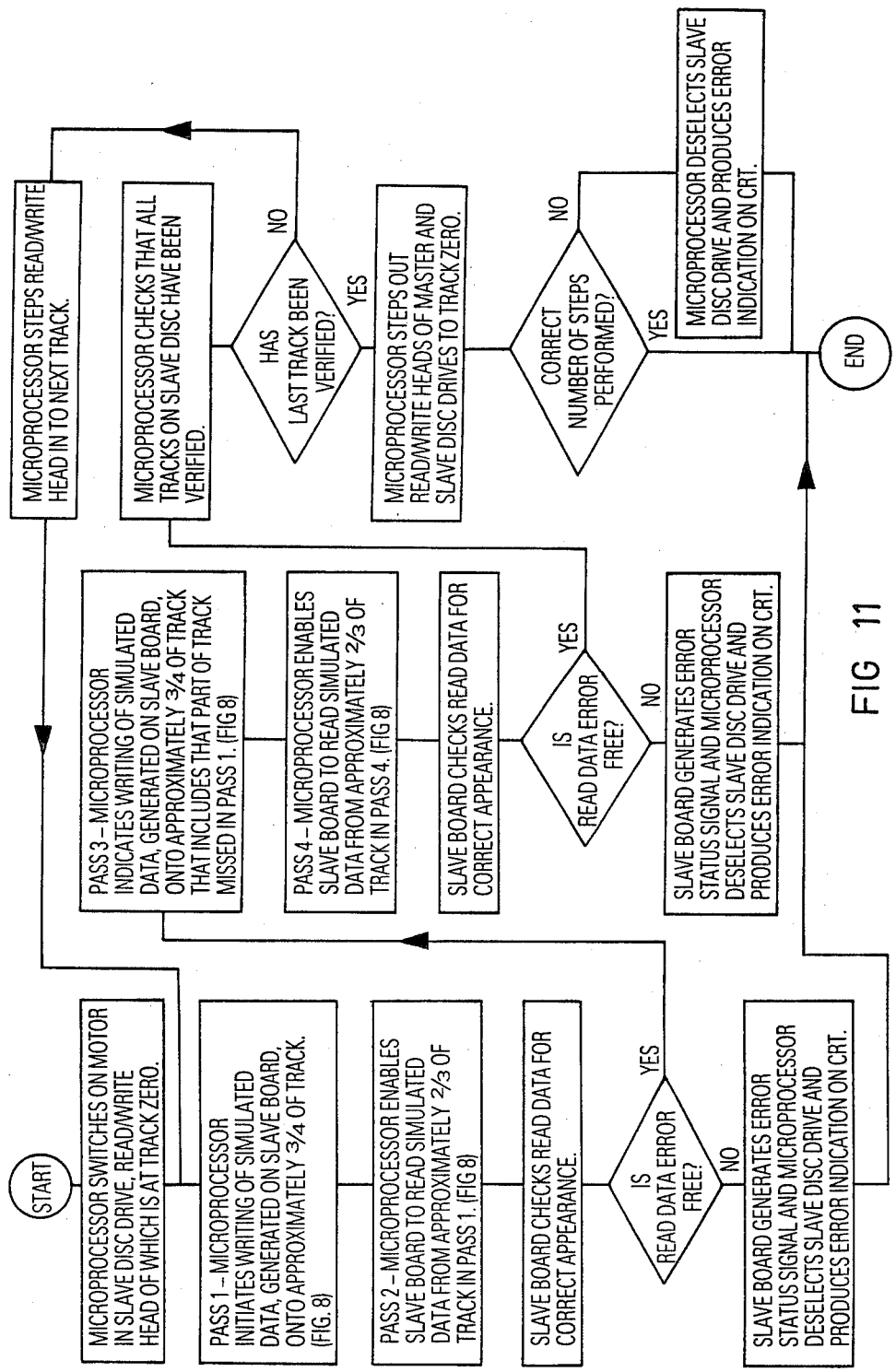

PASS 1

PASS 2

PASS 3

PASS 4

REPRODUCTION OF MAGNETIC RECORDINGS

The present invention relates to the reproduction of magnetic recordings, and particularly to the reproduction of magnetic recordings of digital data information, particularly, but not exclusively, on flexible plastics discs known as "floppy" discs.

Digital information is recorded on discs in a plurality of concentric tracks. Each track may constitute a single data stream or a plurality of shorter data streams separated by gaps known as "buffer zones".

When a disc is in use the digital data information is not only read from the disc, but in some cases new data is "written" or recorded onto the disc to replace part of the original recording. Because of this it is necessary to be able to establish when the transducer of the disc reader unit is located over a buffer zone since it is only in these zones that the transducer or read/write head can be switched between "read" and "write" modes. If such a switch were to take place in the middle of a data stream, due to the unavoidable transients occurring upon switching, corruption of the digital information is likely to take place.

Magnetic recordings made as a plurality of data streams on each track are termed "sectors" and between each sector is a buffer zone the presence of which is identified by information contained in the recorded data stream. Before the presence of such a buffer zone can be identified, however, it is necessary for the instrument reading the disc to be connected to a micro-processor capable of interpreting the information. Different manufacturers of equipment, however, encode discs differently so that in many cases discs cannot be used on apparatus different from that for which it is intended simply because the micro-processors, without the appropriate programme information, cannot "understand" the data on the disc.

Even merely transferring the data from one disc to another, by reading the magnetic recording and making a new recording reproducing it exactly presents difficulties because of this problem of identifying the buffer zones. It will be appreciated that the read/write head has to be moved radially between adjacent concentric tracks, and such radial movements must take place only with the read/write head in the "read" mode. The recording head can only be switched off or to its "read" mode in a buffer zone, however, in order to avoid data corruption by switching transients as discussed above.

The present invention seeks to provide apparatus capable of copying data information from one disc to another regardless of the encoding of information and the format of the disc. The "format" of the disc is constituted by the manner in which the buffer zones are related to the data stream and in some cases to a physical index (usually a hole in the plastics material of the disc) and which may be one of several types. For example, the so-called "hard sectored" discs have a plurality of physical indexes in addition to the main disc index. This allows a plurality of recorded sectors (usually 10 to 16) to be made in each track, each sector being provided with a start and end gap and the buffer zone being constituted by the first start gap and the last end gap.

By contrast, the so-called "soft sectored" indexed disc format allows one or more recordings to be made on each track, with the recordings being of different length according to necessity. The start of each track is referenced to the physical index of the disc, and this is followed by a start gap, one or a plurality of recordings, and finally an end gap. The buffer zone in this case comprises the start and end gaps and the gap at the end of the last recording.

Another disc format is the so-called "non-indexed" soft sectored disc format, which is similar to the indexed soft sectored format, but in this case the start of each recording is not referenced to the physical index of the disc, but is individually identified within its input/output field.

It will be appreciated that with an indexed disc, to transfer data information from a previously recorded disc onto a new disc requires that the angular position of the discs be synchronised so that the data is "written" onto the disc to be recorded at the same location as it is read from the original disc. For the sake of clarity, hereinafter, the original disc from which a copy is to be made will be referred to as the "master" disc and the blank disc onto which a copy is to be transferred will be referred to as the "slave" disc. It will be appreciated, moreover, that copies can be made onto more than one slave disc at a time and the present invention comprehends apparatus capable of producing one or a plurality of copies of a master disc, with each copy being an exact reproduction of the original both as to data content and relative angular orientation of the data and buffer zones.

The present invention seeks to provide apparatus capable of producing reproductions of magnetic disc recordings of any format without the risk of corruption of the data when switching the recording transducer out of its "write" mode to enable track change movements to take place, and independently of the nature of the information recorded on the disc; that is to say the apparatus of the present invention produces copies of a master recording without it being necessary for the copier to interpret the data information in the usual way in order to identify the buffer zones at which transducer switching must take place.

According to one aspect of the present invention, therefore, apparatus for reading information recorded on a data disc and for recording it in the same format onto a second disc, which format comprises digital information in a series of concentric tracks, each track comprising one or a plurality of sectors separated by buffer zones, each sector having a synchronising signal at the leading end thereof, comprises a first disc drive unit for the said data disc, including a first magnetic transducer for producing electrical signals representing the data information recorded on the said data disc, and a second disc drive unit for the said second disc, including a second magnetic transducer for converting electrical signals supplied thereto into magnetic digital information for recording onto the said second disc, means for detecting the occurrence of the said synchronising signal and the said electrical signal generated by the said first magnetic transducer and operable to control the radial movement of the said first and second magnetic transducers for changing tracks in dependence thereon.

Regardless of the nature of the data information recorded on a magnetic disc and/or the recording format, the synchronising signal at the leading end of the sector recorded on a track is almost invariably of an identifiable form, namely a string of digital "one" signals or other recognisable repeating pattern of sufficient length to be clearly identifiable as being different from the data signals in that it is longer than any other repeating pattern which can occur in the data stream. Thus, in one example the synchronising signal comprises a series of uninterrupted digital "one" signals the length of which series is greater than any significant unit of data information which can be recorded in the sector. Of course, in normal reading of a magnetic disc, the synchronising information is immediately followed by the data of the sector, and there is no means of detecting how long an individual sector is going to be in advance. The apparatus of the present invention overcomes this difficulty by rotating the discs, both the master and slave discs, in the reverse direction from that in which the disc is normally read, such that the electrical signal generated by the first transducer is such that each buffer zone is immediately preceded by a synchronisation signal. That is not to say that every synchronisation signal is followed by a buffer zone in which a track change of the transducer is required, but each individual buffer zone is nevertheless identified as a potential track change initiation point should this be indicated by the position in the recording at which track change is required. The term "track change initiation" as used herein will be understood to relate to the preliminary step of switching the recording transducer out of its "write" mode to enable radial movements to be made without corrupting the data on the disc. Once this switching has taken place the physical movement of the transducer need not actually take place within a buffer zone. Because the apparatus of the present invention does not "understand" the data information being transferred from the master to the slave disc there is no way in which the accuracy of the recorded data information on the slave disc can be verified after recording. It is provided, therefore, that the suitability of the slave disc for recording be verified prior to recording to ensure that there are no imperfections which could lead to the failure to record even one digital bit, since even the smallest imperfection could lead to a serious fault in the recording. Thus, in the apparatus of the present invention, there are further provided means for preliminarily recording a test signal over the whole of the working surface of the second disc prior to recording the said data information. The said test signal is preferably preliminarily recorded on and read back from the said second disc in a first set of concentric incompletely circular tracks with the radial, track shift movement of the transducer taking place in the gap between the leading and the trailing ends of each track, and is recorded on and read back from the said second disc in a second set of concentric incompletely circular tracks the gaps between the leading and trailing ends of which are all approximately angularly coincident and lie angularly spaced from the gaps between the leading and trailing ends of the recorded sectors of the said first set of recorded tracks such that the whole of the working area of the disc is covered.

In practice, the tracks of the first and second sets are recorded alternately prior to the track change movement so that the recording of the test signal is effected in one complete operation. In this way, the test signal on any given track is read in the revolution immediately following that in which it has been recorded, with the test signal of the first set on one track being recorded and read, and then the test signal on the other set on that track being recorded and read before the apparatus moves on to the next track. The test signal is preferably in the form of a simulated data signal, and in the preferred embodiment constitutes a train of individual one bits in a square wave having a three to one mark to space ratio.

Upon reading back the test signal it is compared in such a way as to produce an error indication if as much as one of the individual "one" bits of the data information is missing. The apparatus of the invention includes a test circuit comprising first and second retriggerable monostable circuits, the said first retriggerable monostable circuit being connected to receive the said signal read from the second disc and having a time base greater than the time between the occurrence of two consecutive data pulses of the square wave simulated data signal, but less than the time between three consecutive such data pulses such that it is continuously retriggered by a continuous square wave signal if this is continuoulsy available, but commutes if even one transition edge of the square wave does not occur in due time. The said second retriggerable monostable circuit is connected to the first in such a way that it commutes to generate an error signal upon commutation of the simulated data signal is complete, therefore, the first retriggerable monostable circuit is retriggered continuously throughout the whole of the testing operation by the presence of a "one" digital signal at every potential location.

After verification of the slave disc for suitability to recieve the recording, the apparatus acts, if necessary, to synchronise the angular positions of the first and second discs so that the data information can be located in the same orientation on the master and the slave, and for this purpose the physical index hole of the disc is utilised. This is not needed for discs having the "soft-sectored", nonindexed format which will be described in more detail below. After preliminary synchronisation of the angular orientation of the master and slave discs the recording is commenced, but in order to avoid with certainty the possiblity of the tail end of a recorded track being recorded over the leading end thereof in the event of a completely filled track, the slave disc is driven at a speed which is slightly slower than that of the master disc and re-synchronisation of the angular positions for the commencement of each track is effected at least once upon each track recording. Thus, in one embodiment, the apparatus act to rotate the master and slave disc twice to record each track, the first revolution being for the actual recording process, and the second revolution being for re-synchronisation of the angular orientations of the two discs. An an alternative to this process, synchronous motors may be used, or the master and slaves disc drive may be taken from opposite ends of or different points along the same drive shaft, driven by a single motor.

According to a second aspect of the present invention, there is provided a method of copying data recorded on a first disc onto a second disc, in which the first and second disc are rotated to move the surface of the discs past respective magnetic transducers in a direction such that the synchronisation signal recorded at the leasing end of the data and immediately before a buffer zone. In such a method the radial movement of the transducers to change tracks are initiated upon the occurrence of a synchronisation signal occurring after at a whole revolution of the said first disc has taken place since the commencement of recording that track.

The invention will now be more particularly described by way of example, with reference to the accompanying drawings which illustrate various magnetic disc formats, apparatus according to one embodiment of the present invention, and signals occuring at various points in the apparatus and useful for explaining its operation, and in which:

FIG. 10 is a flow chart illustrating the steps performed by the microprocessor in copying from a master disc to a slave disc;

FIG. 11 is a flow chart illustrating the microprocessor steps undertaken in track verification of a slave disc prior to copying;

Figure 1:
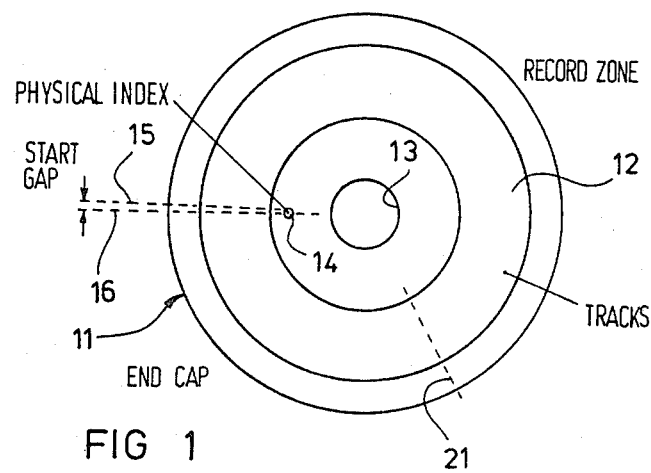
FIG. 1 is a schematic diagram illustrating a magnetic disc having a soft sectored layout and a single recording per track.

Referring first to FIG. 1 there is shown a magnetic disc having a soft sectored disc layout with single recording per track. In FIG. 1 the disc is generally indicated with the reference numeral 11 and the working surface portion of the disc, onto which the magnetic tracks may be recorded, is shown by two concentric lines and indicated with the reference numeral 12. The disc has a central hole 13 for locating it on a disc drive unit, and a physical index hole 14 of smaller diameter positioned radially inwardly of the working area 12 of the desk and defining, by its position, the circumferential location of the beginning of each track. Two imaginary radial lines 15,16 subtended at the centre of the disc 11 by the two circumferentially opposite edges of the physical index hole 14 illustrate the circled "start gap" which is the buffer zone immediately followed by the synchronisation signal indicating the commencement of a track.

Figure 2:
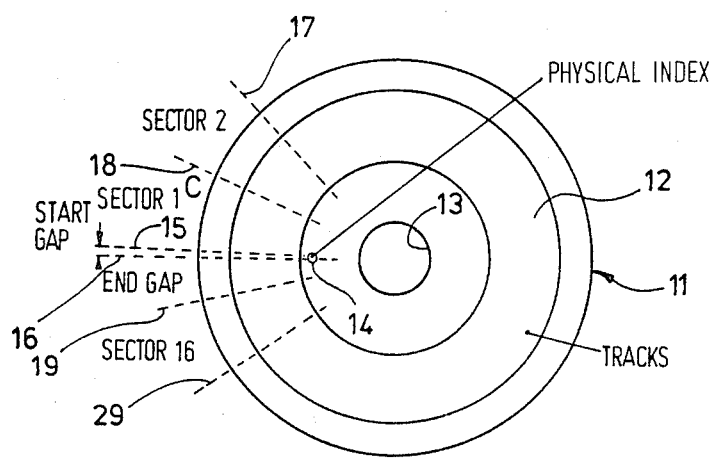
FIG. 2 is a similar diagram illustrating a soft sectored disc with a plurality of recordings per track.

FIG. 2, on the other hand, illustrated a soft sectored disc layout in which there are a plurality of recording per track. In FIG. 2 the same reference numerals have been used to indicate the corresponding component of the disc as in FIG. 1. Here, however, the additional broken outline radial lines 17,18,19,20 represent the commencement of subsequent sectors of recorded information, each sector being headed by a synchronisation signal of the same form as that at the end of the start gap. Although, in the disc illustrated in FIG. 1, a single recording is made per track, the length of each recording in a track may differ. However, if a recording is made over substantially less than a complete revolution of the disc, as is illustrated, for example, by the broken radial line 21 in FIG. 1, the remainder of that track remains blank and the next track is recorded beginning from the start gap identified by the radial lines 15,16. In normal operation of a disc such as that illustrated in FIG. 1 the data information controls the disc reader to displace the read/write head radially between tracks only in the region of the start gap 15/16. In the soft sectored multiple sector layout illustrated in FIG. 2, however, the disc has effectively a plurality of buffer zones one between each sector of a track, and the read/write head may switch track at any buffer zone in accordance with the requirements of the programme during use.

Figure 3:
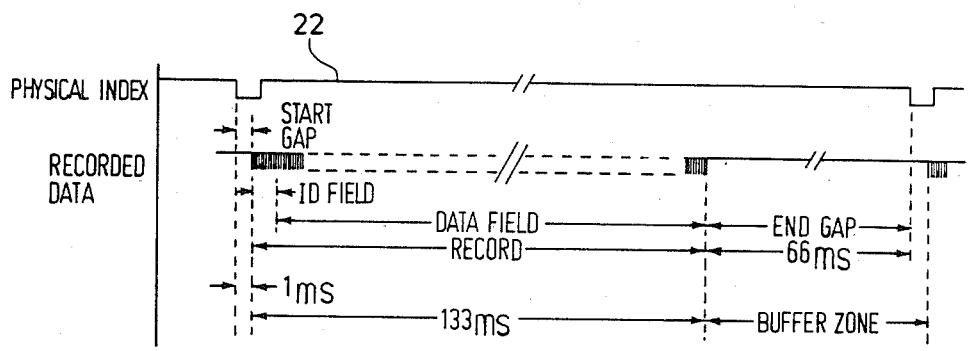
FIG. 3 is a developed diagrammatic view of the recording format of a disc such as that illustrated in FIG. 1.

FIG. 3 illustrates the signal format of a disc such as that illustrated in FIG. 1. All disc readers are provided with means for detecting the physical index and providing a signal in dependence thereof. In FIG. 3 the line 22 represents the signal generated by the physical index sensor. This remains high except where the physical index is present and falls to a low level as the physical index hole passes the sensor. The falling edge of this signal indicates the commencement of the start gap which, in this example, lasts for one millisecond (although the length of the physical indexssignal lasts for longer than this) and at the end of the start gap the recording commences with the synchronisation signal defining the I.D. field followed by the data signal constituting the required digital information. In the example illustrated the whole of the recording lasts for 133 milliseconds following which there is an end gap or buffer zone lasting for 66 milliseconds until the commencement of the start gap triggered by the arrival of the physical index at the detector after a complete revolution.

Figure 4:
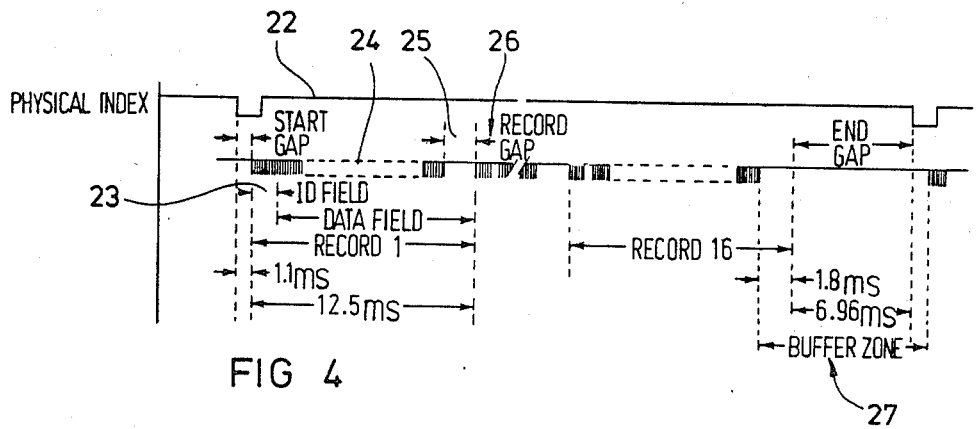
FIG. 4 is a developed view of a recording in the format of a disc such as that illustrated in FIG. 2.

By contrast, the format illustrated in FIG. 4 represents that which would be generated by a disc having a format such as that illustrated in FIG. 2. Here, the signal from the physical index sensor is again identified with the reference numeral 22 and, as before, the falling edge of the physical index sensor signal determines the commencement of the start gap. After 1.1 milliseconds the first record sector commences, again with the synchronisation signal or I.D. field 23 followed by the data field 24. The data field 24 contains the required digital information and includes a record gap 25 between the end of the data and the commencement of a second sector 26 which, as before, commences with an I.D. field in the form of a recognisable synchronisation signal. Such synchronisation signals usually comprise a plurality of consecutive digital "one" bits in an unbroken series longer than can occur during the data field as a unit of data information. In the example illustrated there are sixteen such data fields terminating several milliseconds before the arrival of the next falling edge of the physical index signal 22 to provide a buffer zone 27 between the end of the last recorded sector (in this case the sixteenth) and the commencement of the start gap initiated by the falling edge of the physical index signal. It will be appreciated that, in such a soft-sectored recording, the precise positions of the record gaps 25 between individual sectors will be dependent on the length of each recorded sector and therefore will differ from disc to disc, and from track to track on each disc.

Figure 5:
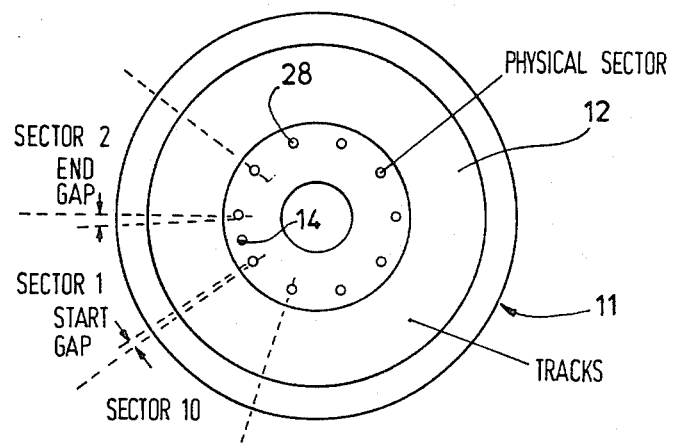
FIG. 5 is a schematic diagram illustrating a magnetic disc with a hard sectored disc format.

FIG. 5 illustrates a so-called "hard sectored" disc layout, in which, in addition to the physical index 14 which indentifies the angular orientation of the disc 11 as a whole, there are provided ten other secondary physical indices of the same form, namely a hole at the same radial location for detection by the same physical index sensor, each defining a sector of the working surface of the magnetic disc which can bear a recorded signal.

Figure 6:
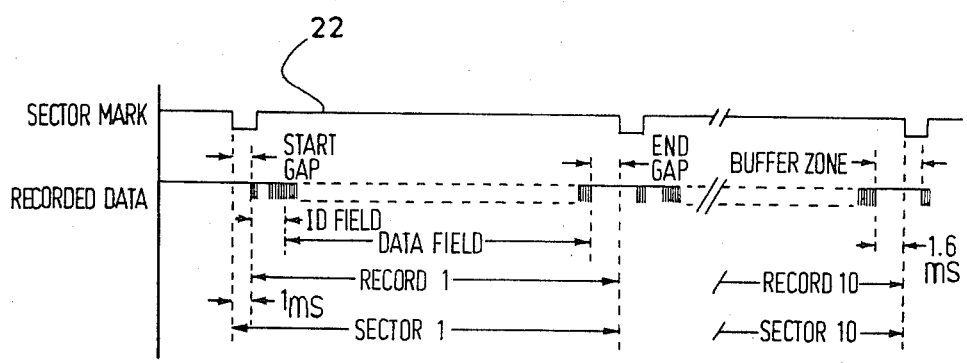
FIG. 6 is a developed view of a magnetic recording such as would be made on a disc as illustrated in FIG. 5.

Here, the first sector of the disc is that in which the physical index 14 appears in the centre. FIG. 6 illustrates a timing diagram of information recorded on a whole sector format disc such as that illustrated in FIG. 5. Again, the signal generated by the physical index sensor is indicated with the reference numeral 22, but instead of producing a single falling edge once per revolution, the signal 22 in this case has eleven negative going pulses, ten of which identify the commencement of each record sector, and the eleventh of which identifies the unique angular orientation of the disc.

Although each sector can be identified uniquely as the region between the occurence of a falling edge on the signals 22 and the next falling edge thereof, the recording covers a period less than this by the provision of a start gap of about one millisecond and an end gap where the data field terminates before the arrival of the next physical index signal. As before, the record commences with an I.D. field or synchronisation signal prior to the data.

It will be seen from the above how, by rotating a disc in the reverse direction, that is so that the signals illustrated in FIGS. 3,4 and 6 are effectively running from right to left instead of the conventional left to right, the occurence of the synchronisation signal is in each case immediately followed by a gap (either the start gap or an end gap) during which no information data is recorded and at which it is safe to effect track switching movements of the read/write head without risk of corruption of the data in the transfer.

Figure 7:
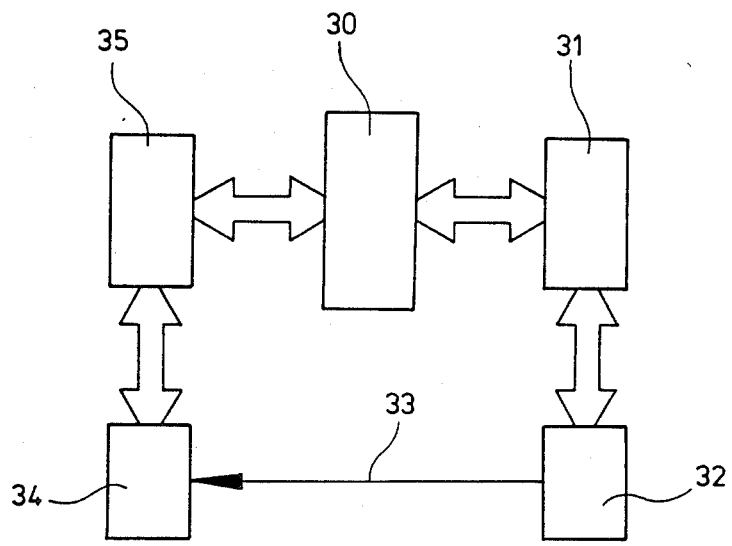
FIG. 7 is a simplified block schematic diagram illustrating the major units of the present invention.

FIG. 7 schematically illustrates the outline format of the apparatus of the present invention comprising a microprocessor 30 in two-way communication with a master disc control unit 31 which controls the operation of a master disc drive unit 32 which is a conventional disc drive unit having a motor for rotating the disc, a magnetic read/write head for reading the recorded information on the disc and producing an electrical signal representative thereof, and a radial read/write head shift system for determining the track on which the read/write head is locked at any one time. Since such a disc drive unit is conventional in the art and since the invention lies in the circuitry for control of the disc drive units these latter will not be described in detail herein. Suffice it to say that the electrical signal output from the master disc drive unit, representing the information read from the disc is fed on a line 33 directly to the input of a slave disc drive unit 34 which, again, can be a conventional disc drive unit the only difference being in the manner in which the drive unit 34 is controlled by a slave control unit 35 which, again, is in two-way communication with the microprocessor 30.

Figure 8:
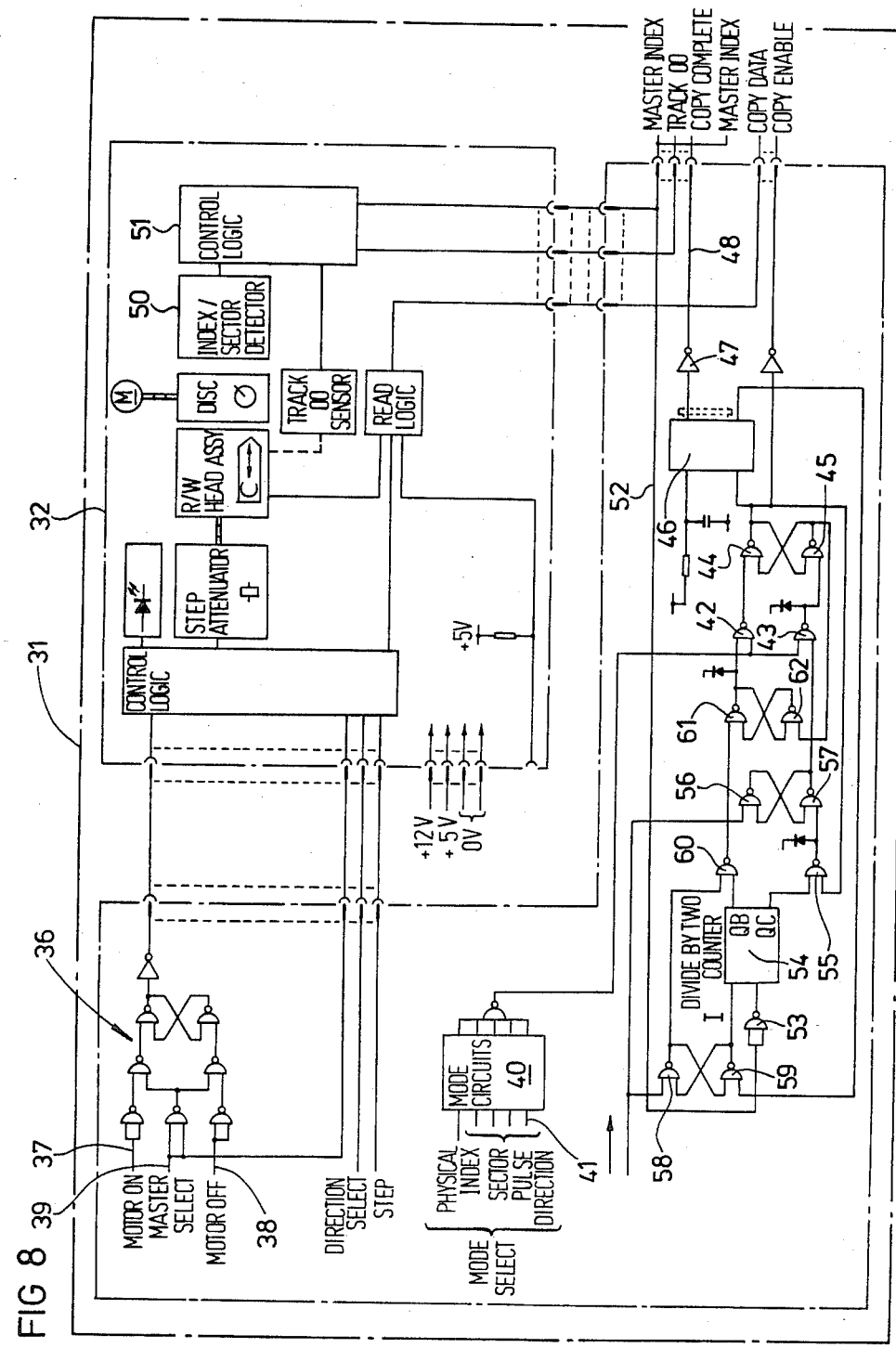
FIG. 8 is a circuit diagram illustrating the master disc drive control unit of the invention.

The master disc control unit 31 is illustrated in more detail in FIG. 8, which also includes a schematic representation of the component parts of the master disc drive unit 32.

The master control unit comprises a NAND gate network generally indicated 36 for controlling the disc drive motor and receives "motor on" signal on line 37, "motor off" on line 38 and an enabling "master select" on line 39. The lines 37,38 and 39 are connected to the microprocessor 30.

The nature of the master disc format must be known when the operator is loading the disc into the master disc drive unit. In order to ensure that the microprocessor 30, and the master control unit 31 operate in the appropriate manner in dependence on the nature of the disc format. Mode circuits 40 are provided for this purpose, controlled by input lines 41 from the microprocessor. The output of the mode circuit 40 is fed to two NAND gates 42, 43 which feed a latching pair of NAND gates 44, 45 feeding a monostable circuit 46 the output of which, after inversion by an inverter 47 constitutes a "copy complete" signal on line 48 which leads back to the microprocessor 30.

The master disc drive unit 32 includes an index sensor 50 which, via control logic 51 of the disc drive unit 32 provides a signal on line 52 whenever the physical index is detected. This line 52 leads to a NAND gate 53 supplying a divide-by-two counter 54 having two outputs, one of which is fed to a NAND gate 55 which is also fed with the "copy enable" signal from the output of the latching NAND gates 44, 45 and which in turn feeds a latching NAND gate pair 56, 57 the output from which constitutes the second input to the NAND gate 43 which is also fed, as a second input, the "go copy" signal from the microprocessor. This signal is also fed to a NAND gate 58 of a latching pair including the NAND gate 59 the output from which is fed to the divide-by-two counter 51 whilst the output from the NAND gate 58 is fed to a NAND gate 60 the other input to which is connected to the divide-by-two counter 54 and the output from which feeds a NAND gate 61 which forms a latching pair with a NAND gate 62 the other input of which is fed from the output of the NAND gate 15. The operation of these NAND gate circuits will be described in greater detail with reference to the timing diagrams referred to below.

Figure 9:
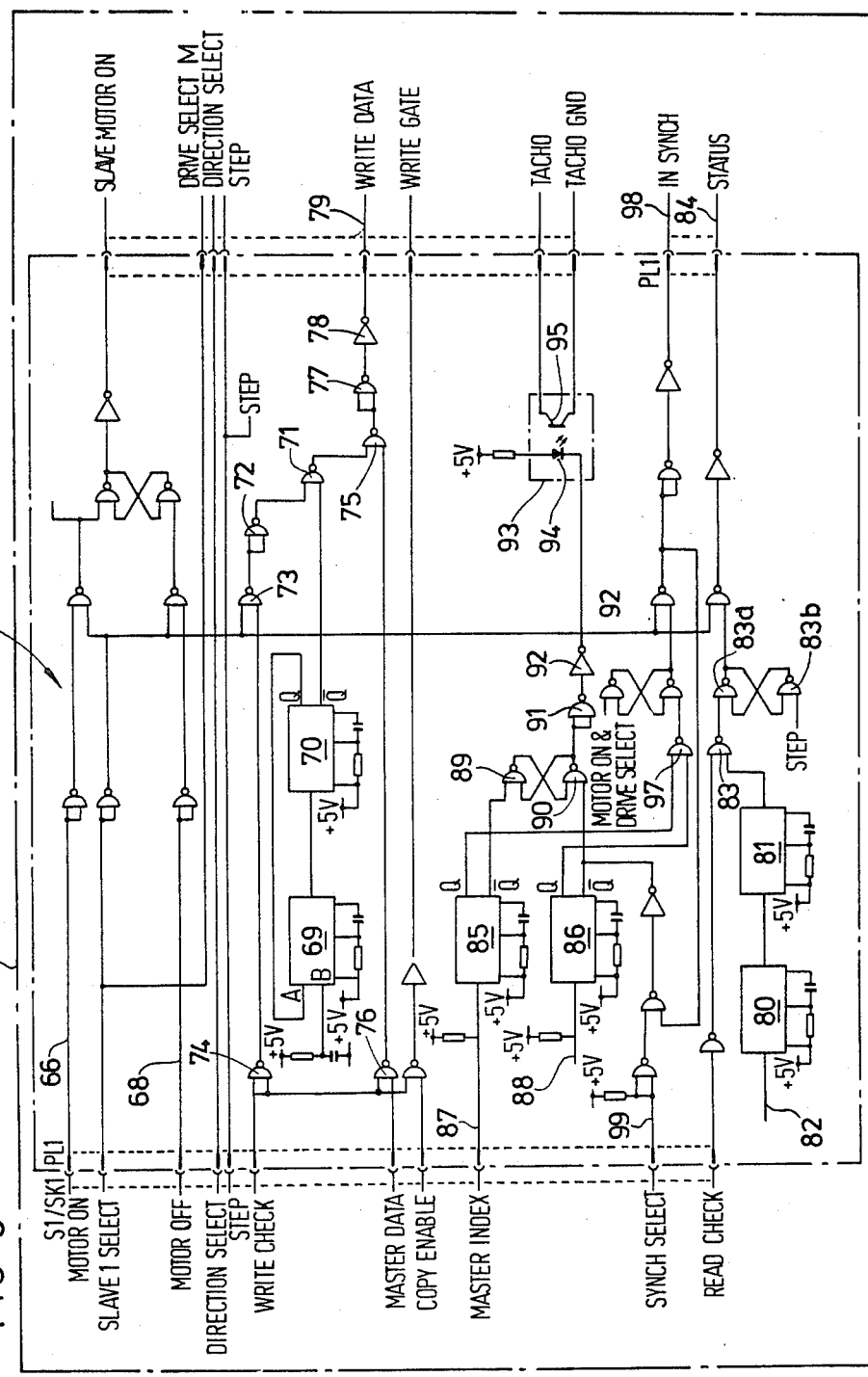
FIG. 9 is a circuit diagram illustrating the slave disc drive control unit in more detail.

The slave control unit 35 illustrated in FIG. 9 comprises a NAND gate circuit generally indicated 65 controlled by input lines 66, 67, 68 respectively controlling "motor on", slave select and "motor off" and leading from the microprocessor 30 whereby to control the motor of the slave drive unit 34.

The slave drive unit 35 illustrated in FIG. 9 also includes two monostable circuits 69, 70 for generating simulated data for the track verification process to be described in more detail. The simulated data comprises a continuous train of pulses with a mark to space ratio of three to one. This signal is fed to a NAND gate 71 enabled via a pair of NAND gates 72, 73 and a NAND gate 74 from the "right check" signal issued by the microprocessor. The simulated data gated through the NAND gate 71 is supplied to a NAND gate 75 enabled via a NAND gate 76 which is fed not only with the "right check" but also a "master data" signal from the master control unit 31. The simulated data signal from the gate 75 is fed via a NAND gate 77 and an inverter 78 to a "right data" line 79 leading to the slave disc drive unit 34.

Checking of the simulated data recorded on the disc is effected by two retriggerable monostable circuits 80, 81. The former of these is fed with the data signals read from the disc by the read/write head of the slave disc drive unit 34, which supplies a line 82 leading to the retriggerable monostable circuit 80. The time base of the retriggerable monostable circuit 80 is longer than the wave length of the signal arriving on the line 82. Thus, providing this signal is continuous the circuit 80 is continuously retriggered and produces no output. The monostable circuit 81 has an output gated through a NAND gate 83 which receives a "read check" signal to produce an output which leads to a "status" line 84 if the monostable circuit 81 is triggered. The signal on the line 84 thus remains at logic zero as long as the retriggerable monostable circuit is re-triggered by continual arrival of the simulated data signals read from the disc being checked, and goes to logic level one if an error is detected.

Synchronisation of the angular position of the master and slave discs is effected by two monostable circuits 85, 86 the first of which receives, as input signal, the output signal from the master physical index detector on a line 87, and the second of which receives a signal from the slave disc physical index detector, arriving on a line 88. The $\overline{Q}$ ouput of the monostable circuits 85, 86 are fed to respective NAND gates 89, 90 the output from the latter of which is fed, via a NAND gate 91 and an inverter 92 to a photo-detector circuit 93 to turn off a light emitting diode 94 thereof in the period between the arrival of the signal on the line 87 from the master disc physical index detector and the arrival on the line 88 of the signal from the slave disc physical index detector. While the light emitting diode 94 is extinguished this is detected by the photo transistor 95 and the speed control of the slave disc drive unit to cause its motor to accelerate in the time period between the arrival of the master disc physical index signal and the slave disc physical index signal. The slave disc is thus progressively accelerated towards a position where it is synchronised with the master disc. When the output from the Q port of the monostable circuits 85,86 occur together this is detected by a NAND gate 97 which leads to a "in sync" line 98 on which appears a signal representing synchronisation of the slave and master discs.

The process followed by the microprocessor in preliminarily synchronising the discs and normal data copying is illustrated in the flow chart of FIG. 10. From this it can be seen that the microprocessor first switches on the motor in the master disc drive unit 32 and switches on the motor in the slave disc drive unit 34 after a deliberate delay. It will be appreciated that the copier apparatus of the present invention is not limited to a single slave disc drive unit 34, but may have any number of such units operating in parallel to produce identical copies from a single master disc in the master disc drive unit 32. After it has switched on the slave disc drive unit or units the microprocessor produces a "sync select" signal which arrives on line 99 of the slave control unit 35 to enable the synchronisation operation. From the worst case of a 359° phase difference it will take no more than five revolutions for the slave disc drive to accelerate the slave disc to the synchronism with the master disc and accordingly the microprocessor allows five full revolutions before checking if the discs are synchronised. If the discs are not synchronised after five revolutions have passed the microprocessor produces an error indication and the slave disc drive unit is turned off. If the discs are synchronised any other disc drive units are likewise polled and once all the slave disc drives have been checked the microprocessor removes the sync select signals and performs disc speed stabilisation before issuing the "go copy" signal to enable a track of master data to be read from the master disc and recorded on the first track of the slave disc or discs. The microcprocessor then checks whether the track recorded is the last track of the master disc, and if not the read/write heads of the master and slave disc drive units 32,34 are stepped to the next track in an appropriate buffer zone.

Because, as mentioned above, the slave drive units are driven at a slightly slower speed than the master drive unit in order to avoid the possibility of overlapping a recorded signal at the end of a track with the recording at the beginning of the track, the synchronisation step is repeated during the first revolution of the master and slave discs after track switching, and fifty milliseconds after the arrival of the master physical index signal the "sync select" signal is removed and the microprocessor produces the next "go copy" pulse to enable the next track of master data to be written onto the next track of the slave disc or discs. After this, the microprocessor again checks if the last track has been copied, and if not, the process is repeated until the last track has been copied, after which the microprocessor steps out the read/write head of both the master and the slave disc drive units to track zero, counting the number of track change movements to check that no mechanical failure of the slave drive unit has taken place during recording, to allow unloading of the now copied discs.

Figure 12A:
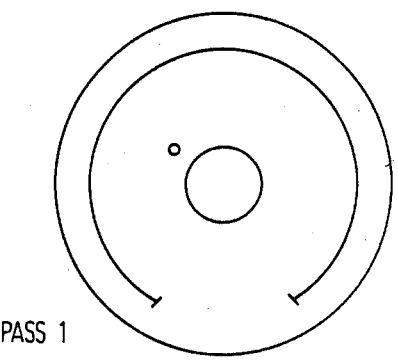
FIG. 12a, 12b, 12c and 12d are schematic diagrams illustrating a slave disc and the track verification recording and read back format.
Figure 12B:
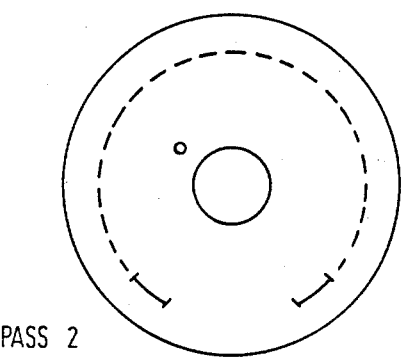

FIG. 11 is a flow chart illustrating the steps formed in verifying the disc prior to the synchronisation steps described in relation to FIG. 10. Here the microprocessor first sets the read/write head of the slave disc drive unit 34 to track zero and the motor is switched on. At this time the master disc drive unit is turned off. In the first revolution of the disc the microprocessor initiates writing of the simulated data generated in the monostable circuit 69, 70 of FIG. 9 over approximately three quarters of the track as illustrated in FIG. 12a and in FIG. 13 which shows the simulated data being written under the control of the "write check" signal for a period of 150 milliseconds whilst the time period between two consecutive physical reference index signals is 200 milliseconds. After the first complete revolution the date information recorded during the first revolution is read back under the control of the "read check" signal shown in FIG. 13 which occupies a period of approximately two thirds of a complete revolution as illustrated by the broken outline of FIG. 12b.

Figure 12C:
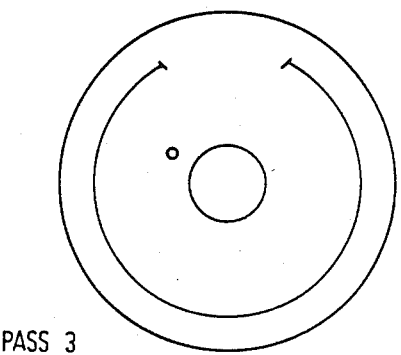
Figure 12D:
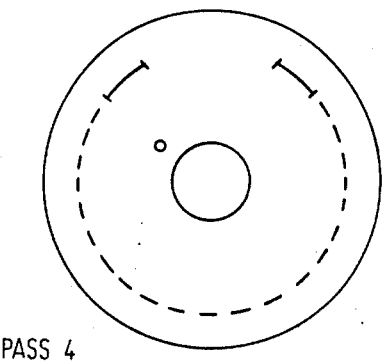
Figure 13:
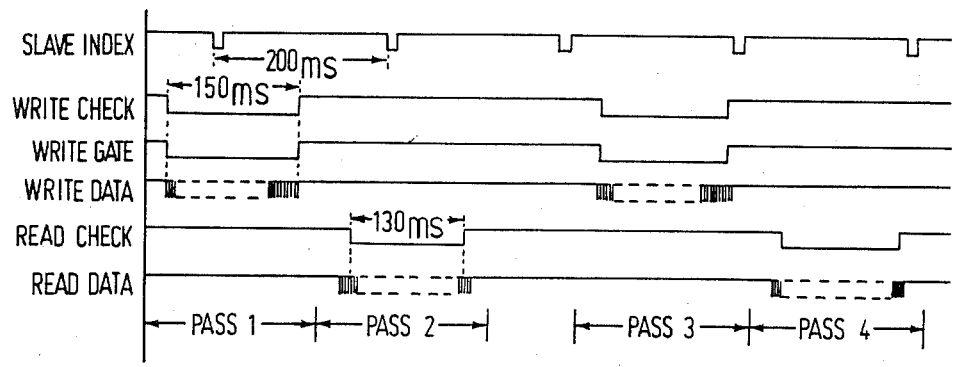
FIG. 13 is a timing diagram illustrating the signals recorded and read back from the slave discs during track verification.
Figure 14:
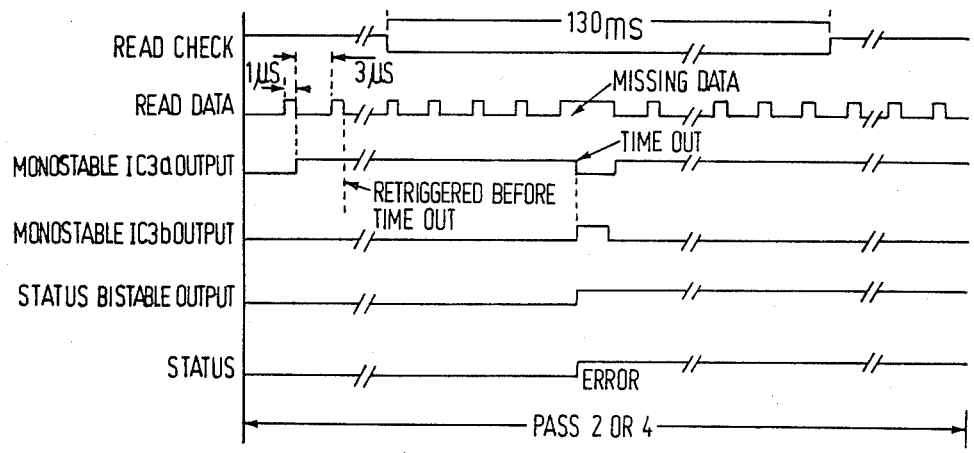
FIG. 14 is a time diagram illustrating the operation of the track verification circuits.

This portion of the first track is thus verified assuming the error signal has not been generated on the "status" line 84 of the slave disc drive unit 35. Then, as illustrated in FIG. 12c and FIG. 13, during the third revolution of the disc the "write check" signal causes data to be written over a sector spanning approximately three quarters of the disc and including the gap left unwritten in the first revolution. Finally, in the fourth revolution, the "read check" signal causes the data information written during the third revolution to be read over a period of approximately two thirds of the revolution as illustrated in FIG. 12d. The timing signals checking the simulated data are illustrated in FIG. 14 which shows, on a larger scale, the "read check" signal of 130 milliseconds as the uppermost line whilst the second line represents the data which includes a missing pulse. The third line represents the output of the monostable circuit 80 which is continually re-triggered before time out until the arrival of the missing data at which time it commutes causing the monostable circuit 81 to commute from a zero to a "one" level for its time period. The positive-going edge of the output signal from the monostable circuit 81 triggers the latch constituted by the NAND gates 83a, 83b, however, so that the signal appearing on the "status" line 84 remains high to provide an error indication.

Figure 15:
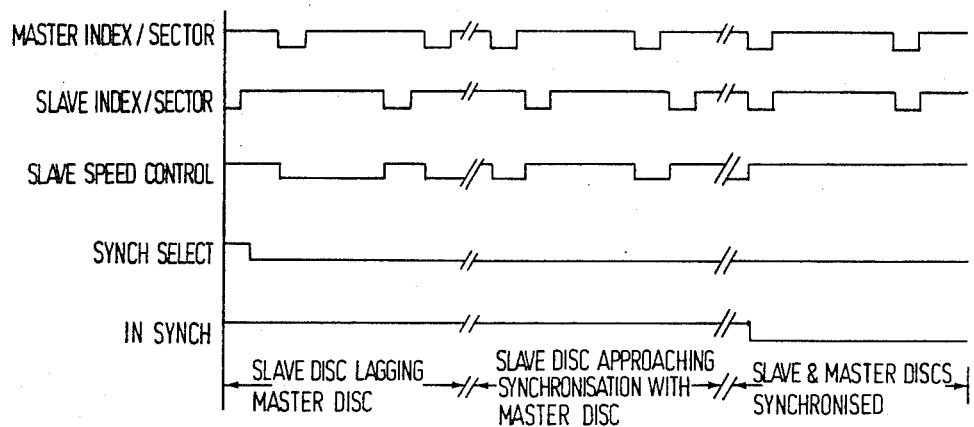
FIG. 15 is a timing diagram illustrating the disc synchronisation operation after track verification has been completed.

The synchronisation of the master and slave discs is illustrated by the timing diagram of FIG. 15 which shows in the upper line the negative-going pulses representing the passage of the physical reference index of the master disc past the master disc drive unit detector, whilst in the second line the negative-going pulses represent the passage of the slave disc physical reference index past the detector of the slave drive unit. The slave disc speed control is operated during the period between the occurrence of the leading edges of these two pulses to acclerate the slave disc drive motor. This is represented by the "zero" portions of the signal in the third line of FIG. 15 which, as can be seen, are progressively shorter as the discs approach synchronisation. Upon the occurrence of the fifth master index pulse the slave index pulse is coincident indicating synchronisation of the two discs and causing triggering of the "in sync" signal (the fifth line of FIG. 15).

Figure 16:
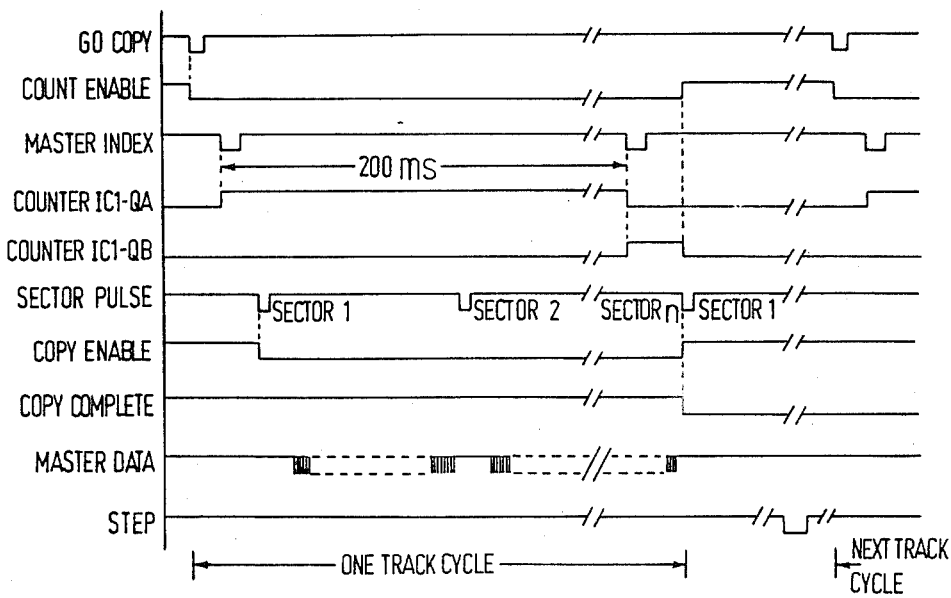
FIG. 16 is a timing diagram illustrating some signals useful in explaining the operation of the system.

Finally, with reference to FIG. 16, the timing diagram of the circuit operating with a soft-sectored disc format is illustrated. After the "go copy" signal generated by the microprocessor upon synchronisation of the angular orientation of the discs it is required to establish the appropriate position to commence recording of the master data. The "go copy" signal sets the count bistable circuit 54 of the master control unit 31 to produce the "count enable" signal illustrated in FIG. 16. The first physical reference index pulse of the master disc which occurs after this point, illustrated as the negative pulse in the "master index" line of FIG. 16 is applied on line 52 to the NAND gate 53 at the input of the counter 54. The OB output of the counter 54 goes to logic 1 and sets the bistable circuit comprised of the latching NAND gate 61, 62 via the NAND gate 60. The output of the bistable circuit is fed to the NAND gate 12 the other input of which is fed from the mode circuits 40 which determines whether the "copy enable" signal is generated immediately or, as in the case illustrated in FIG. 16, awaits the switch point pulse from the mode circuit. Upon the occurrence of this switch point pulse, as illustrated in FIG. 16, the "copy enable" signal goes to logic zero where it is held by the bistable circuit constituted by the NAND gates 44 and 45.

The "copy enable" signal is gated through the slave disc drive control unit 35 and sets the slave disc drive unit to the write mode. The data on the master disc is continuously read therefrom and is similarly gated through the slave disc drive control unit via the NAND gates 76, 75, 77 and 78 to be written onto the slave disc. The next occurring physical index pulse on the master disc resets the QB output of counter 54 to logic zero and the QC output to logic 1 to set a bistable circuit comprising the NAND gates 56, 57 the output from which is applied to the NAND gate 43 which functions in a manner similar to that described above to reset the "copy enable" bistable constituted by the NAND gates 44, 45. The "copy enable" signal is thus removed and the falling edge of the bistable output triggers the monostable circuit 46 to apply the "copy complete" pulse to the microprocessor and at the same time to reset the count bistable circuit 54 via the NAND gate 59.

The track shift movement of the read/write head and subsequent re-synchronisation of the discs takes place as described above before the next track is recorded in the same manner. When the last track on the master disc has been read the microprocessor, which is preliminarily supplied with information identifying the number of tracks to expect, sets the "direction select" line to logic 1 and produces step pulses to reset the read/write heads of the or each slave disc drive unit to the outermost track (referred to as track zero). The microprocessor checks that all the disc drives have produced a signal indicating that the read/write head is that track zero and then ends the copy sequence.

What is claimed is:

1. Apparatus for reading information recorded on a data disc and for recording it in the same format onto a second disc, which format comprises digital information in a series of concentric tracks, each track comprising a plurality of sectors separated by buffer zones, each sector having a synchronizing signal at the leading and thereof, said apparatus comprising:

a second disc drive unit for said second disc, including a second magnetic transducer for converting electrical signals supplied thereto into magnetic digital information for recording onto said second disc, and means for detecting the occurence of said synchronizing signal in said electrical signal generated by said first magnetic transducer and operable to control the radial movement of said first and second magnetic transducers for changing tracks in dependence thereon, and wherein said first and second disc drives both operate to rotate their respective discs in a reverse direction from that in which the discs are rotated in use, such that in the electrical signal generated by said first transducer each buffer zone is immediately preceded by a synchronization signal.

2. The apparatus of claim 1, wherein there are further provided means for preliminarily recording a test signal over the whole of the working surface of said second disc prior to recording said data information and wherein said recording means operates to record said test signal onto said second disc in a first set of concentric incompletely circular tracks and there are provided reading means operable to read said test signal back from said second disc in said first set of concentric incompletely circular tracks with the radial, track shift movement of said transducer taking place in the gap between said leading and trailing ends of each said track, and to record and read back from said second disc test signals in a second set of concentric incompletely circular tracks the gaps between the leading and trailing ends of which are all approximately angularly coincident with one another and lie angularly spaced from said gaps between the leading and trailing ends of said recorded sectors of said first set of recorded tracks such that the whole of the working area of said disc is covered.

3. The apparatus of claim 2, wherein said reading means operates to read said test signal on any given track in the revolution immediately following that in which it has been recorded, with the test signal of said first set on one track being recorded and read, and the test signal on the other set on that track being recorded and read before the apparatus moves on to the next said track.

4. The apparatus of claim 2, wherein,
said test signal generated for recording onto said second disc comprises a simulated data signal in the form of a square wave;

said test signal read back from said second disc is tested for completeness to obtain an indication of a fault in said second disc, and first and second retriggerable monostable circuits are provided for verification of said recorded simulated data signal, said first retriggerable monostable circuit being connected to receive said signal read from said second disc and having a time base greater than the time between the occurence of two consecutive data pulses of the square wave simulated data signal but less than the time between three consecutive data pulses thereof such that it is continuously re-triggered by a continuous square wave signal and commutes if even one transition edge of the square wave does not occur in due time.

5. The apparatus of claim 4, wherein said second retriggerable monostable circuit commutes to generate an error signal upon commutation of said first retriggerable monostable circuit.

6. The apparatus of claim 1, wherein said second disc is driven to rotate at a slower speed than said first disc whereby to ensure that the whole of any recorded track on said first disc is recorded onto said second disc in less than one revolution.

7. A method of reading information recorded on a data disc and recording it in the same format onto a second disc, which format comprises digital information in a series of concentric tracks, each track comprising a plurality of sectors separated by buffer zones, each sector having a synchronizing signal at the leading end thereof, said method comprising the steps of:

providing a first disc drive unit for said data disc, including a first magnetic transducer for reading said data disc and producing electrical signals representing said digital information recorded on said data disc said first magnetic transducer being movable radially of said data disc, providing a second disc drive unit for said second disc, including a second magnetic transducer movable radially of said second disc, said second transducer being operable to convert electrical signals supplied thereto into magnetic digital information for recording onto said second disc, providing detector means for detecting the occurence of said synchronizing signal in said electrical signal produced by said first magnetic transducer, said detector means being operable to trigger the radial movements of said first and second magnetic transducers for changing tracks, and rotating said first and second discs in a reverse direction from that in which said discs are rotated in normal use, such that in the electrical signal generated by said first transducer the synchronization signal recorded at the leading end of each sector of data appears at the end of the data and immediately before a buffer zone.

8. The method of claim 7 further comprising the step of rotating said data disc at least a whole revolution from the commencement of recording of a track thereof before radial movements of said transducers to change tracks are initiated upon the occurence of a synchronization signal.

9. The method of claim 8, wherein the relative angular positions of said data disc and said second disc are resynchronized after recording each said track and before recording the next track.

10. The method of claim 8, wherein said second disc is verified by recording simulated data over the whole of its working surface and reading back the thus recorded simulated data to verify that no faults exist in said second disc such as would cause a failure properly to record said data to be copied, said verification being effected immediately before said data is recorded onto said second disc.

* * * * *